US012443030B2

(12) United States Patent
Sasaki

(10) Patent No.: US 12,443,030 B2
(45) Date of Patent: Oct. 14, 2025

(54) MEMS DEVICE

(71) Applicant: STANLEY ELECTRIC CO., LTD., Tokyo (JP)

(72) Inventor: Takeshi Sasaki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 667 days.

(21) Appl. No.: 17/836,910

(22) Filed: Jun. 9, 2022

(65) Prior Publication Data

US 2022/0404612 A1 Dec. 22, 2022

(30) Foreign Application Priority Data

Jun. 11, 2021 (JP) ................................ 2021-098326

(51) Int. Cl.
*G02B 26/08* (2006.01)
*B81B 3/00* (2006.01)

(52) U.S. Cl.
CPC ........ *G02B 26/0858* (2013.01); *B81B 3/0086* (2013.01); *B81B 2201/042* (2013.01); *B81B 2203/0118* (2013.01); *B81B 2207/07* (2013.01)

(58) Field of Classification Search
CPC ............ G02B 26/0858; G02B 26/0816; G02B 26/08; G02B 26/101; G02B 26/105; G02B 26/0833; B81B 3/0086; B81B 2201/042; B81B 2201/032; B81B 2203/0118; B81B 2207/07; B81B 7/0006; H10N 30/2041; H10N 30/2042; H10N 30/204
USPC ...................................................... 359/224.1
See application file for complete search history.

(56) References Cited

U.S. PATENT DOCUMENTS

| 2006/0098059 | A1* | 5/2006 | Ohguro .................. H03H 9/587 |
| | | | 257/E27.006 |
| 2013/0140156 | A1* | 6/2013 | Fujii ...................... H01H 57/00 |
| | | | 29/25.35 |
| 2017/0155879 | A1 | 6/2017 | Giusti et al. |
| 2018/0172985 | A1* | 6/2018 | Yoshida ................. G02B 7/181 |
| 2018/0190895 | A1* | 7/2018 | Giusti ............... H10N 30/2043 |

FOREIGN PATENT DOCUMENTS

| JP | S62290890 A | 12/1987 |
| JP | 3895507 B2 | 12/2006 |
| JP | 2009253035 A | 10/2009 |

(Continued)

OTHER PUBLICATIONS

Japanese Office Action (and an English language translation thereof) dated Feb. 25, 2025, issued in counterpart Japanese Application No. 2021-098326.

(Continued)

*Primary Examiner* — Jyotsna V Dabbi
(74) *Attorney, Agent, or Firm* — Holtz, Holtz & Volek PC

(57) ABSTRACT

A light deflector includes: a conductor layer formed as an integral layer on an SOI oxide film layer; a piezoelectric element having an upper electrode, a piezoelectric film, and a conductor layer serving as a lower electrode; an interlayer insulating film covering the conductor layer and the piezoelectric element from the surface side; a plurality of wirings formed on the surface of the interlayer insulating film in such a manner as to extend in the region of the surface of the interlayer insulating film under which the conductor layer exists; and a ground electrode connected to the conductor layer.

5 Claims, 13 Drawing Sheets

(56) References Cited

FOREIGN PATENT DOCUMENTS

| JP | 2013083769 A | | 5/2013 | |
|----|--------------|---|--------|---------|
| JP | 2018128505 A | * | 8/2018 | ............... B81B 3/00 |
| JP | 2019219549 A | | 12/2019 | |

OTHER PUBLICATIONS

Japanese Office Action (and an English language translation thereof) dated Dec. 3, 2024, issued in counterpart Japanese Application No. 2021-098326.

* cited by examiner

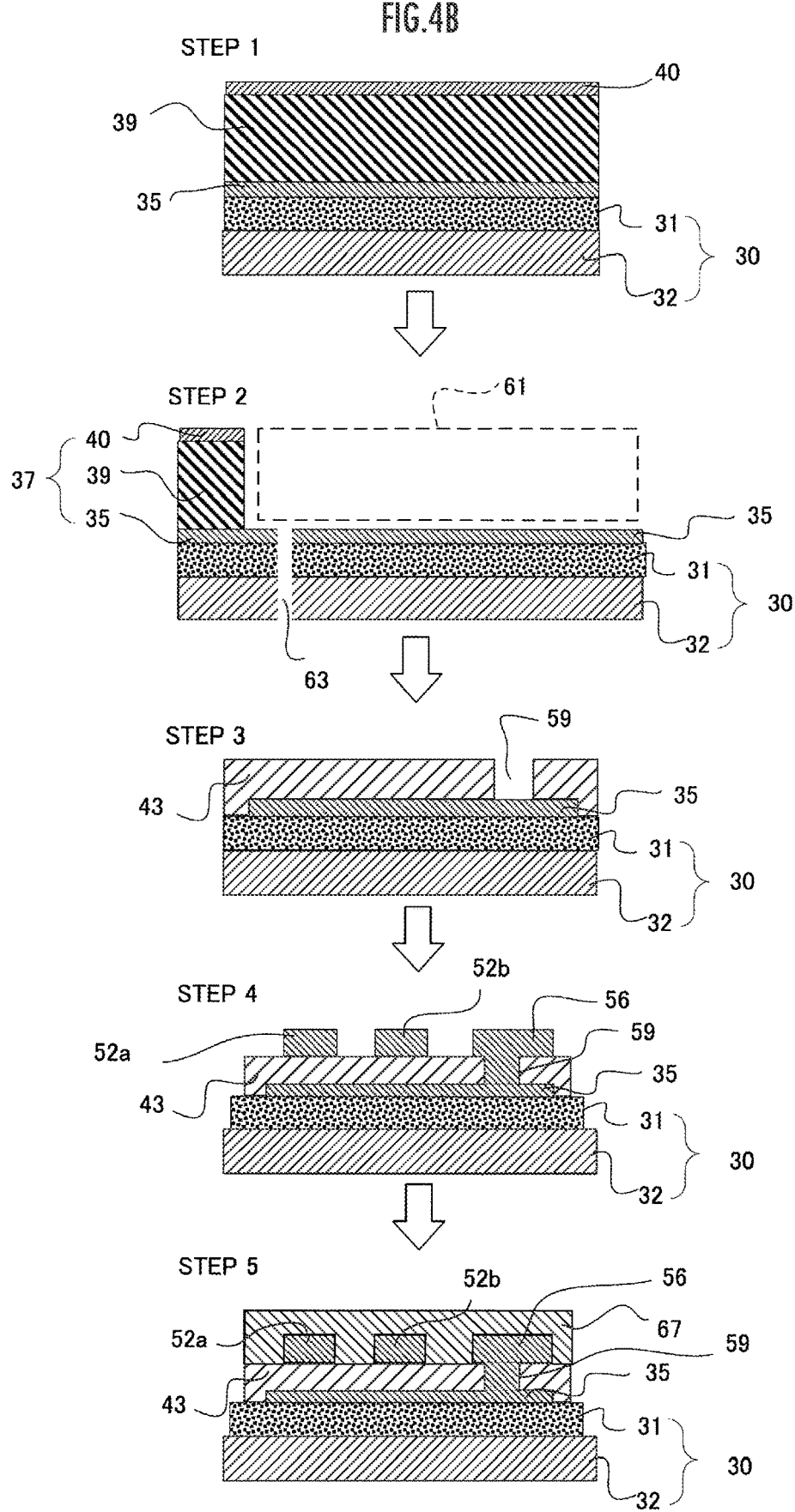

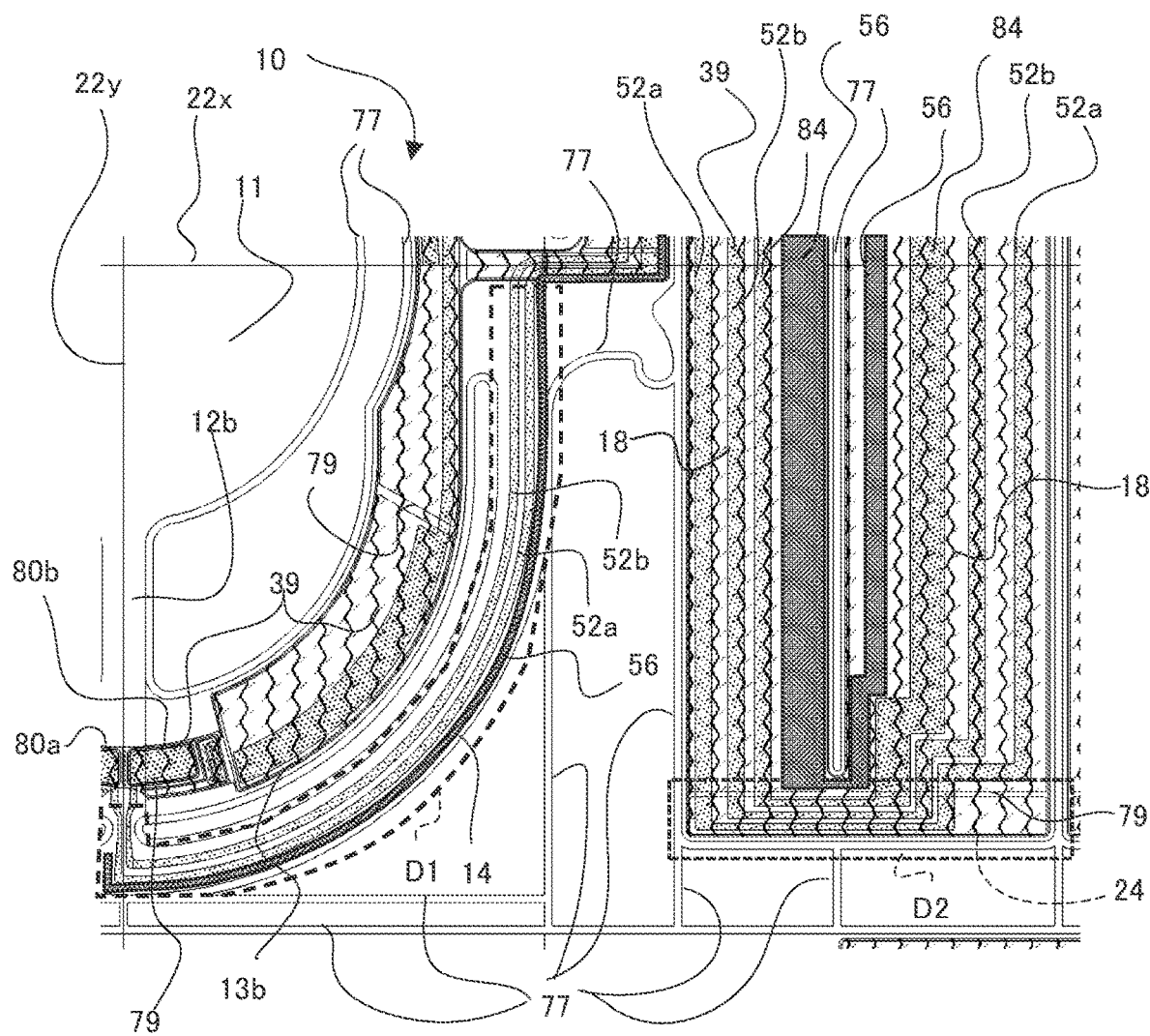

MEMS DEVICE

BACKGROUND OF THE INVENTION

1. Field of the Invention

The present invention relates to a MEMS (Micro Electro Mechanical Systems) device.

2. Description of the Related Art

A light deflector manufactured as a MEMS device includes a piezoelectric element for rotating a mirror section thereof in a reciprocating manner around a predetermined axis or for detecting the deflection angle of the mirror section around the axis.

In the MEMS device, the piezoelectric element is composed of a laminated structure of an upper electrode, a piezoelectric film, and a lower electrode in this order from top, and is manufactured by being stacked on a silicon on insulator (SOI), which serves as a silicon substrate. The piezoelectric element is covered with an insulating film, and the upper electrode and the lower electrode of the piezoelectric element are connected to an electrode exposed from the insulating film through a wiring formed on the insulating film (e.g., Patent Documents 1 to 3).

Patent Document 1: Japanese Unexamined Patent Application Publication No. 62-280890
Patent Document 2: Japanese Patent No. 3895507
Patent Document 3: Japanese Unexamined Patent Application Publication No. 2009-253035

The surface of the SOI, on which the piezoelectric element is stacked, is composed of a silicon oxide (an oxide film insulating layer). Meanwhile, a high-frequency current flows through a signal wiring and a power feed wiring.

Therefore, the insulating layer of the surface of the SOI acts as a capacitive element, while the silicon layer of the SOI acts as a current path for high-frequency current, thus causing crosstalk between a plurality of signal wirings. Crosstalk leads to deterioration of the detection accuracy of a sensor.

SUMMARY OF THE INVENTION

An object of the present invention is to provide a MEMS device that effectively prevents crosstalk.

A MEMS device in accordance with the present invention includes:
  a silicon substrate which has an insulating layer on a surface side, and is composed of a first region where a piezoelectric element is formed and a second region where the piezoelectric element is not formed;
  an insulating film which covers the piezoelectric element from the surface side; and
  a plurality of wirings which are formed in a surface region of the insulating film and through which signals flows,
    wherein the piezoelectric element is composed of an upper electrode, a piezoelectric film, and a lower electrode in this order from top,
    the second region includes a conductor layer, the insulating film and the plurality of wirings extending from the first region and being stacked on the conductor layer, and
    the conductor layer in the second region is grounded.

According to the present invention, the conductor layer formed on the insulating layer of the silicon substrate constitutes an electrode at the location of the piezoelectric element, and acts as a ground layer, which shuts off the insulating layer of the silicon substrate under the plurality of signal wirings at a location where the piezoelectric element is absent. As a result, signal current is prevented from flowing in and out between the plurality of wirings, thus making it possible to prevent crosstalk between the wirings.

BRIEF DESCRIPTION OF THE DRAWINGS

FIG. 4B is a process diagram in which the sections in some steps are the sections of a movable frame with respect to FIG. 4A;

FIG. 7 is a front view of a major part of a wafer before individual light deflectors are cut out;

DESCRIPTION OF THE PREFERRED EMBODIMENTS

Figure 1:
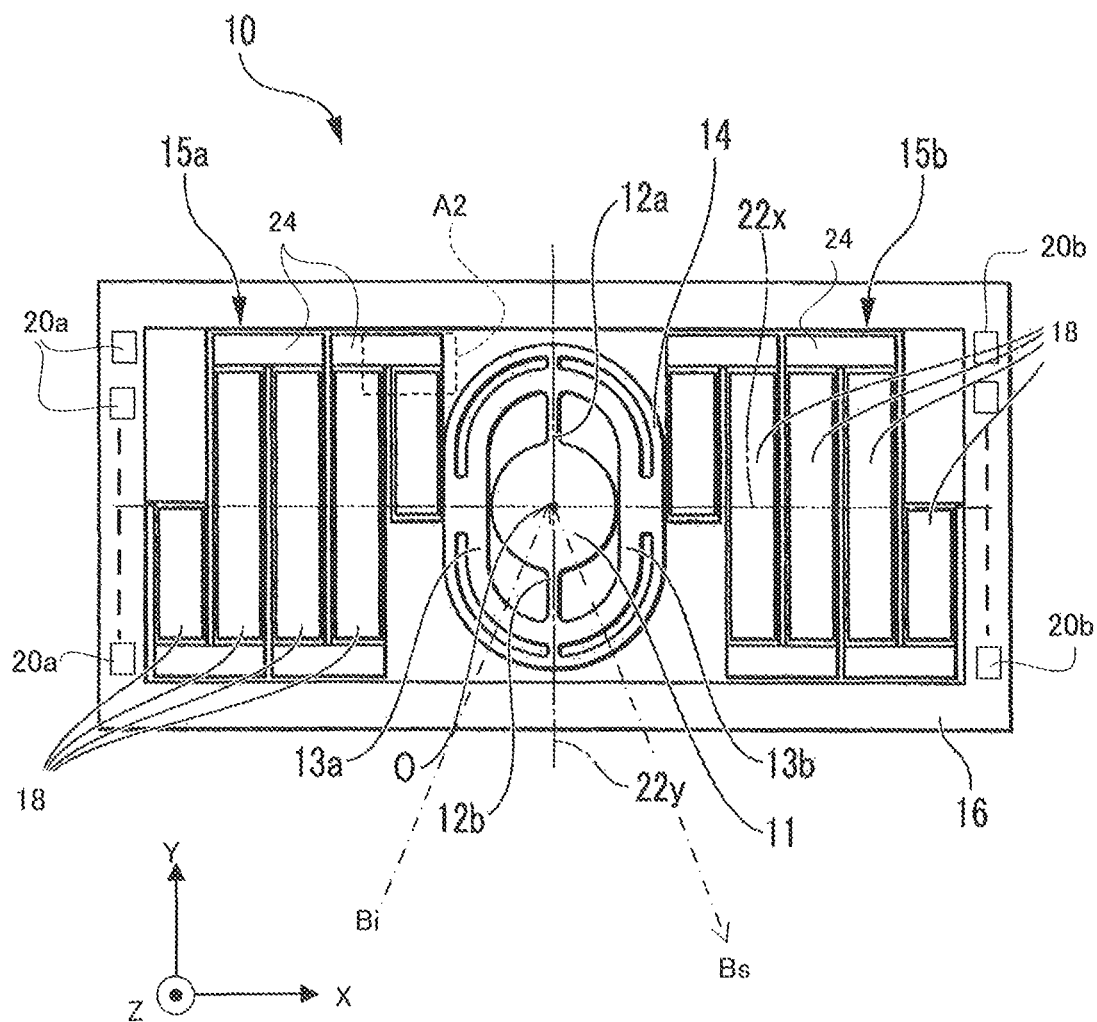
FIG. 1 is a front view of a light deflector which is an example of a MEMS device.

The following will describe an embodiment of the present invention with reference to the accompanying drawings. It is needless to mention that the present invention is not limited to the embodiment. The present invention can be implemented in a variety of modified forms within the scope of the technical concept thereof. Throughout the drawings, the same constituent elements will be assigned the same reference numerals.

(Overview of the Light Deflector)

FIG. 1 is a front view of a light deflector 10 which is an example of a MEMS device. For the convenience of describing the configuration of the light deflector 10, a three-axis coordinate system will be defined. The peripheral contour of the light deflector 10 is rectangular in the front view of the light deflector 10. An X-axis and a Y-axis are parallel to the long sides and the short sides of the light deflector 10, respectively. A Z-axis is parallel to the thickness direction of the light deflector 10.

FIG. 1 illustrates the light deflector 10 in a deactivated state. The light deflector 10 has parts other than a fixed frame 16 as movable parts. The movable parts are displaced from the state illustrated in FIG. 1 when the light deflector 10 is activated.

The light deflector 10 of the MEMS includes a mirror section 11, torsion bars 12a and 12b, inner actuators 13a and 13b, a movable frame 14, outer actuators 15a and 15b, and the fixed frame 16.

The mirror section 11 is positioned at the center of the light deflector 10, and is circular in this example. An incident beam Bi enters a center O of the mirror section 11 from a light source (not shown). The mirror section 11 swings in a reciprocating manner around two axes, namely, a first rotation axis 22y and a second rotation axis 22x, which are orthogonal to each other at the center O by the operation of an inner actuator 13 (generic term for the inner actuators 13a and 13b) and an outer actuator 15 (generic term for the outer actuators 15a and 15b). Consequently, the incident beam Bi is reflected by the mirror section 11 and turned into a scanning beam Bs, which is emitted from the mirror section 11. The scanning beam Bs performs luster scanning in an irradiated region thereof. The inner actuator 13 and the outer actuator 15 are both piezoelectric actuators.

The inner actuators 13a and 13b are placed on both sides of the mirror section 11 in an X-axis direction and are coupled to each other on the first rotation axis 22y, forming an annular body. The annular body is semicircular on both sides in a Y-axis direction and has a straight contour in the middle, and surrounds the mirror section 11.

The movable frame 14 has the same shape as that of the inner actuator 13, and surrounds the inner actuator 13.

The torsion bars 12a and 12b project from the mirror section 11 in directions opposite to each other in the Y-axis direction, and extend along the first rotation axis 22y. Each torsion bar 12 (generic term for the torsion bars 12a and 12b) is coupled to the inner periphery of the movable frame 14 at the distal end thereof, and coupled to the inner actuator 13 at the middle.

The outer actuators 15a and 15b are placed on both sides in the X-axis direction with respect to the movable frame 14, and interposed between the movable frame 14 and the fixed frame 16. The outer actuator 15 is composed of a plurality of cantilevers 18 coupled in series arranged in a meander pattern. Each of connection sections 24 interconnects the cantilevers 18 that are adjacent to each other in the X-axis direction.

Each of the cantilevers 18 has a piezoelectric film 39 (FIG. 2A), and a drive voltage is applied to the piezoelectric film 39 to bend the cantilever 18 in the Z-axis direction. Drive voltages having mutually opposite phases are applied to the cantilevers 18 adjacent to each other in the X-axis direction. Consequently, the amount of displacement in the Z-axis direction between both ends of each of the cantilevers 18 is added, and the movable frame 14 is rotated, with a large deflection angle, in a reciprocating manner around the rotation axis parallel to the X-axis.

Electrode pads 20a and 20b are formed on the short sides of the fixed frame 16. The light deflector 10 is sealed in a package (not shown) and used. At that time, each electrode pad 20 (generic term for the electrode pads 20a and 20b) is connected to corresponding electrodes on the package by bonding wires (not shown). Each electrode pad 20 is connected to each piezoelectric element through the wirings (e.g., signal wirings 52a and 52b, a grounding wiring 56, and power feed wirings 84, which will be described later) in the light deflector 10 to guide signal current or drive current.

The operation of the light deflector 10 will be schematically described. The inner actuator 13 rotates the mirror section 11 in a reciprocating manner around the first rotation axis 22y at a resonant frequency (e.g., approximately 16 kHz) via the torsion bar 12. The outer actuator 15 rotates the movable frame 14 in a reciprocating manner around a rotation axis parallel to the X-axis at a non-resonant frequency (e.g., 60 Hz). This causes the mirror section 11 to rotate in a reciprocating manner around the second rotation axis 22x and the first rotation axis 22y, respectively. When the mirror section 11 faces the front while the light deflector 10 is in operation, the second rotation axis 22x and the first rotation axis 22y are parallel to the X-axis and the Y-axis, respectively.

The inner actuator 13 and the outer actuator 15 are both unipolar piezoelectric actuators.

(Characteristic Section)

Figure 2A:
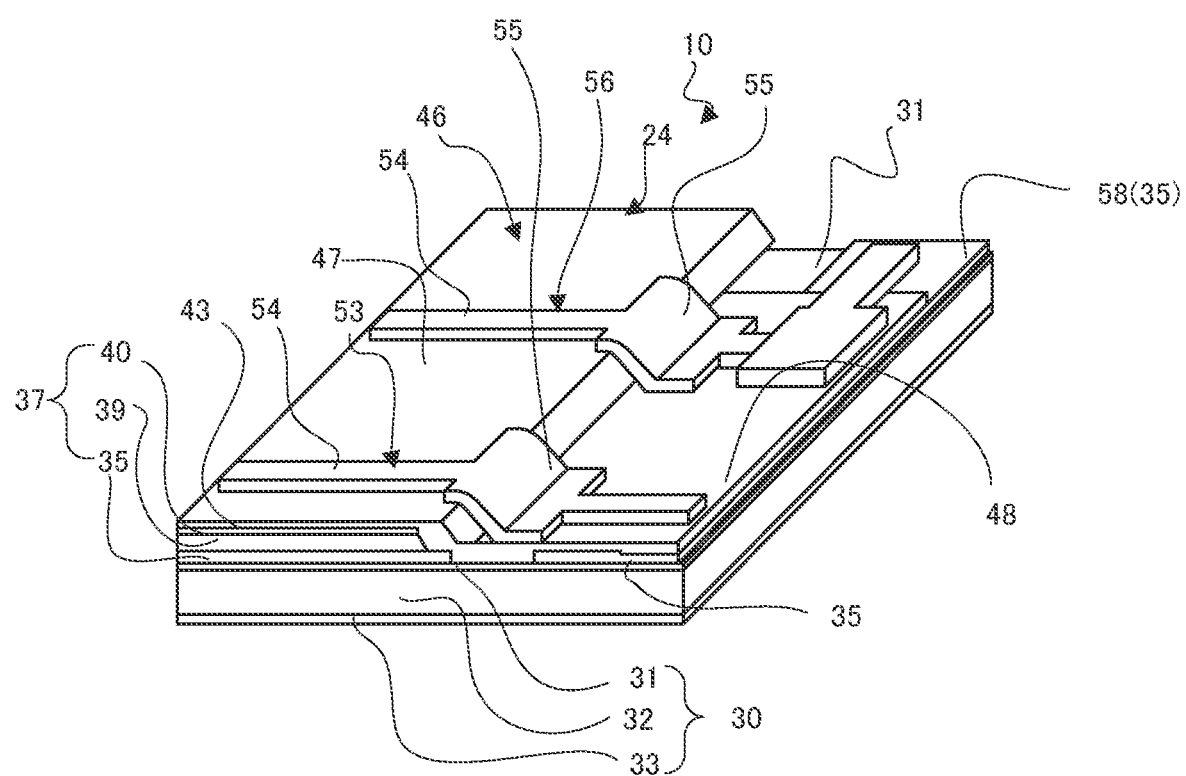
FIG. 2A is a perspective view of a characteristic section of the light deflector.

FIG. 2A is a perspective view of the characteristic section of the light deflector 10. FIG. 2A is an enlarged view of a part A2 encircled by a dotted line in FIG. 1, and illustrates a boundary part of the cantilever 18 and the connection section 24. Referring to FIG. 2A, the light deflector 10 has an SOI 30 and a piezoelectric element 37 formed as a laminated structure of approximately three layers on the SOI 30. The SOI 30 has a three-layer structure composed of an oxide film layer 31, a silicon (Si) layer 32, and a BOX oxide film layer 33 (embedded oxide film) in this order from top. Actually, the SOI 30 further has a handle silicon layer below the BOX oxide film layer 33, and an oxide film layer further below the handle silicon layer, so that the SOI 30 has a laminated structure with a total of five layers. However, in the SOI 30, the two layers below the BOX oxide film layer 33 are removed to ensure flexibility of the piezoelectric element 37 in an area excluding the fixed frame 16 and ribs (not shown) mainly formed in a region directly below the mirror section 11 to maintain rigidity.

A conductor layer 35 in the present embodiment is separated left and right by an interlayer insulating film 43 into a lower portion of the piezoelectric element 37 and an upper portion of the oxide film layer 31 of the connection section 24 in the vertical sectional part illustrated in the drawing.

The conductor layer 35 is made of a material containing platinum (Pt) as a main component. The piezoelectric element 37 has a three-layer laminated structure composed of a conductor layer 35, a piezoelectric film 39, and an upper electrode 40 in this order from bottom. The piezoelectric film 39 is made of, for example, PZT (lead zirconate titanate). The upper electrode 40 is made of the same material as that of the conductor layer 35.

The interlayer insulating film 43 covers the entire surfaces of the oxide film layer 31, which is exposed at the boundary portion between the cantilever 18 and the connection section 24 except for the portion of a ground electrode 58, the conductor layer 35 of the connection section 24, and the piezoelectric element 37 of the cantilever 18. The surface of a surface region 46 includes a first surface region 47 and a second surface region 48. The first surface region 47 and the second surface region 48 cover, respectively, the piezoelectric element 37 and the conductor layer 35 on the connection section 24 where the piezoelectric element 37 is not formed. The first surface region 47 is positioned higher than the second surface region 48 in the height direction, which is the thickness direction of the light deflector 10.

A wiring 53 in FIG. 2A is formed and extends on the surfaces of the first surface region 47 and the second surface region 48, and includes flat extending portions 54 and inclined extending portions 55. The flat extending portions 54 extend on the horizontal planes of the first surface region 47 and the second surface region 48, and the inclined extending portions 55 extend on the inclined portions, which are in the boundary portion between the first surface region 47 and the second surface region 48. The wiring 53 is easily peeled off from the surface region 46 at the inclined portions along the extension line. Therefore, the width of the inclined extending portions 55 is appropriately made larger than the width of the flat extending portions 54 to enhance the adhesion of the wiring 53 in the inclined portions. Although only one wiring 53 is illustrated in FIG. 2A, a plurality of wirings are actually extended. The wirings 53 include signal wirings 52a and 52b connected to sensors, which will be described later, power feed wirings 84 corresponding to the inner actuator 13 and the cantilevers 18, respectively, and each thereof includes the flat extending portions 54 and the inclined extending portions 55, and extends in the horizontal planes of the first surface region 47 and the second surface region 48.

Figure 6:
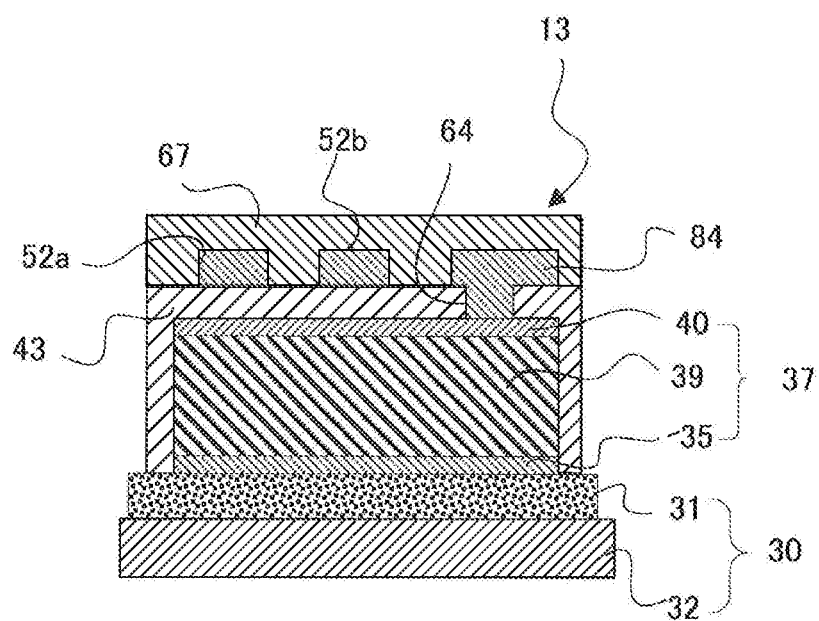
FIG. 6 is a diagram illustrating the sectional structure at the location of a piezoelectric element.

The grounding wiring 56 in FIG. 2A is formed and extends on the surface of the second surface region 48. The ground electrode 58 is formed as a portion where the conductor layer 35 of the connection section 24 is exposed from the surface region 46 (the second surface region 48). The grounding wiring 56 is connected to the ground electrode 58 at one end. As with the wiring 53, the grounding wiring 56 also includes the flat extending portions 54 and the inclined extending portions 55, and extends on the horizontal planes of the first surface region 47 and the second surface region 48. The flat extending portion 54 in the first surface region 47 extends in parallel to both the signal wiring 52a and the power feed wirings 84 (FIG. 6). The grounding wiring 56 connected to the ground electrode 58 is connected to the earth of a drive circuit (not shown) at the other end.

Figure 2B:
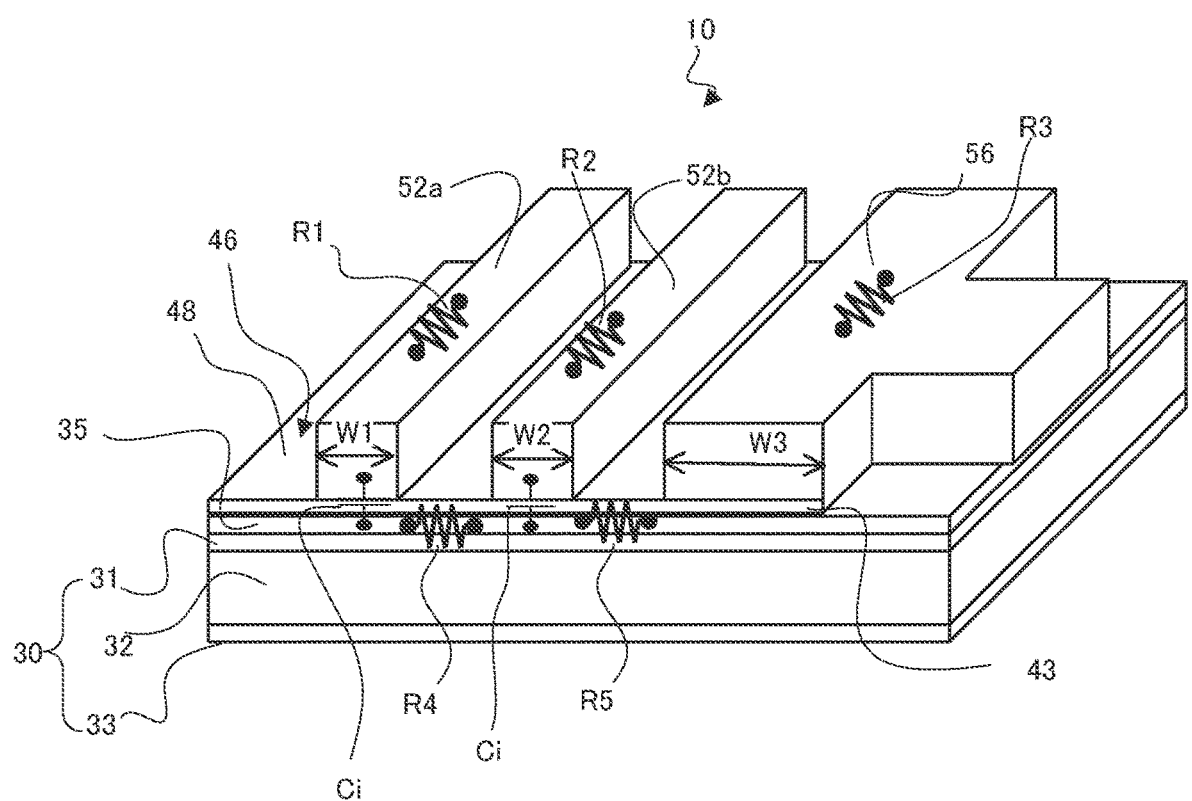
FIG. 2B is a configuration diagram of a major part of a connection section of the light deflector provided with crosstalk preventive measures.
Figure 2C:
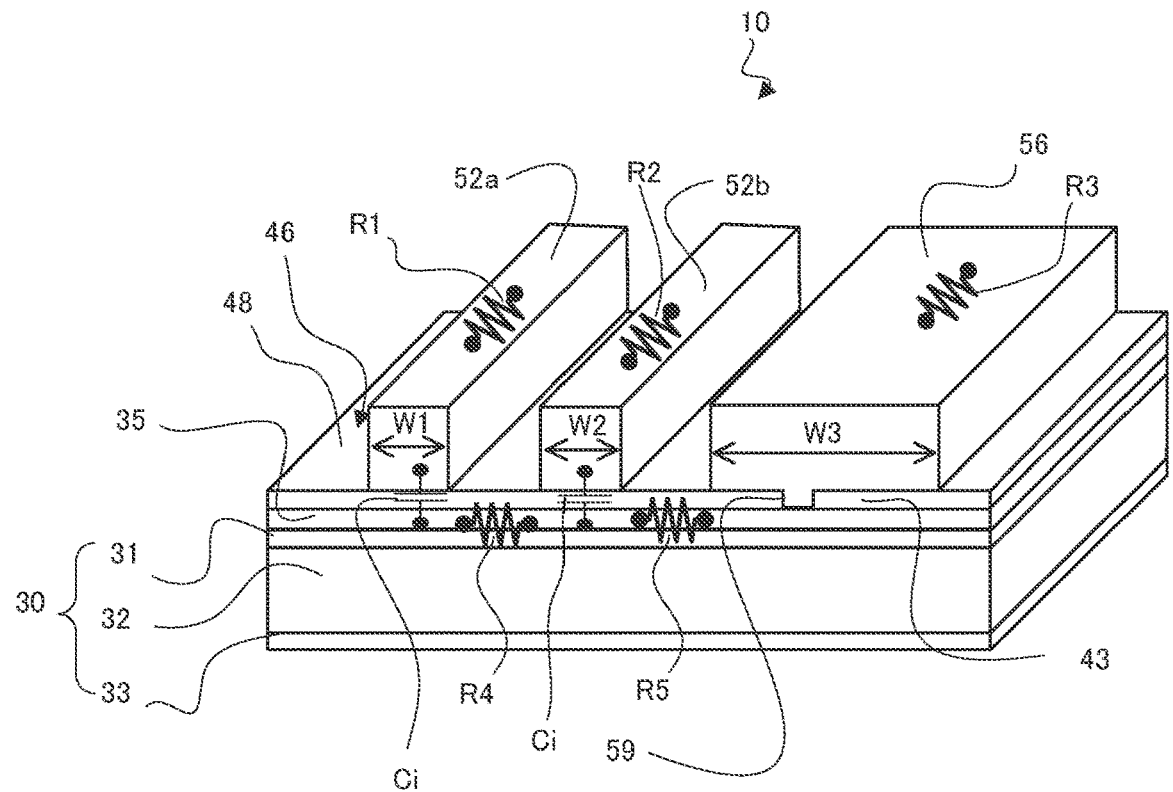
FIG. 2C is a configuration diagram of a major part at a place different from the connection section of the light deflector provided with the crosstalk preventive measures.

FIG. 2B and FIG. 2C are configuration diagrams illustrating the major section of the crosstalk preventive measures at a location in the connection section 24 (FIG. 2A) and a location other than the connection section 24 (a place different from that of FIG. 2A). In the wiring 53, only the signal wirings 52a and 52b are illustrated for a description, and a plurality of the power feed wirings 84 actually exist but are omitted in the drawings. The signal wirings 52a and 52b are connected to deflection angle sensors 80a and 80b (FIG. 7), respectively, to guide signals related to the deflection angle of the mirror section 11 around the axis of the torsion bar 12. The signal wirings 52a and 52b are formed at positions symmetrical with respect to the axis of the torsion bar 12, so that the currents of the signals of the signal wirings 52a and 52b have opposite signs.

Referring to FIG. 2B, the three wirings, namely, the signal wirings 52a and 52b, and the grounding wiring 56, extend in parallel in the second surface region 48 of the surface region 46. The grounding wiring 56 is connected in a region where the interlayer insulating film 43 has been removed and the conductor layer 35 has been exposed. A via may be used to connect the grounding wiring 56 and the conductor layer 35. FIG. 2C illustrates a modified example using vias. A plurality of vias 59 are formed at appropriate positions or at predetermined intervals along the extending direction in the interlayer insulating film 43 on the lower surface side of the grounding wiring 56. The grounding wiring 56 extends downward at each of the vias 59 and are connected to the conductor layer 35. At the locations of the vias 59, the distance in the height direction between the oxide film layer 31 and the interlayer insulating film 43 is short, thus making it advantageous for the connection between the grounding wiring 56 and the conductor layer 35.

The conductor layer 35 is made of a material containing, for example, platinum as a main component. The grounding wiring 56 is made of a material containing, for example, aluminum (Al) as a main component. The conductor layer 35 and the grounding wiring 56 are both metals and conductors. On the other hand, the interlayer insulating film 43 is a dielectric.

Referring to FIG. 2C, the symbols are defined as follows:

R1: Wiring resistance of the signal wiring 52a

R2: Wiring resistance of the signal wiring 52b

R3: Wiring resistance of the grounding wiring 56

R4: Resistance of the length between the signal wiring 52a and the signal wiring 52b in the conductor layer 35

R5: Resistance of the length between the signal wiring 52b and the grounding wiring 56 in the conductor layer 35

Cox: Capacitance of the interlayer insulating film 43

In: Noise current propagating in the conductor layer 35

Ic: Crosstalk current

Ig: Ground current

Further, W1 to W3 are defined as follows. In FIG. 2C, W1=W2<W3. W1 to W3 will be used in Table 1 and Table 2, which will be described later.

W1: Width of the signal wiring 52a

W2: Width of the signal wiring 52b

W3: Width of the grounding wiring 56

Figure 2D:
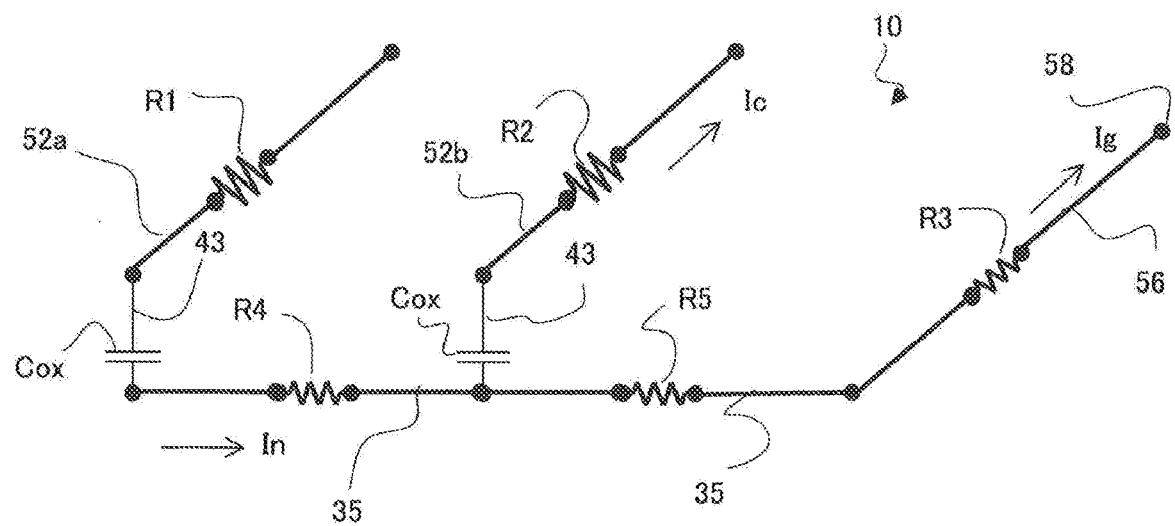
FIG. 2D is an equivalent circuit diagram of FIG. 2B and FIG. 2C.

FIG. 2D is the equivalent circuit diagram of FIG. 2C. Ic is determined as follows:

$$I_C = I_n \frac{R3 + R5}{R5 + R3 + R2 + 1/j\omega C_{ox}} \quad \text{(Formula 1)}$$

The following can be seen from Formula 1. The noise current In is divided into Ic and Ig. A ratio Ic/Ig is distributed in proportion to the reciprocal of each path impedance. Therefore, it is effective to control R3 and R5 to be low. Consequently, it is effective to shorten the connection distance between the grounding wiring 56 and the signal wiring 52b to reduce R5, and to make the grounding wiring 56 thicker to reduce R3.

The following Table 1 shows the relationship among the frequency of a signal of the signal wiring 52a, the width W3 of the grounding wiring 56, and the amount of crosstalk when the signal wirings 52a and 52b of FIG. 2C are the wirings on the output side and the input side, respectively. The amount of crosstalk is defined as the signal power of the signal wiring 52b divided by the signal power of the signal wiring 52a. Further, W1=W2=20 µm is applied, and W3 is denoted as GND wiring width W in Table 1.

TABLE 1

| Frequency f | GND wiring width w[μm]→ | | | | | | | | Amount of crosstalk db | | |
|---|---|---|---|---|---|---|---|---|---|---|---|
| [Hz] ↓ | 1 | 2 | 5 | 10 | 20 | 50 | 100 | 200 | 500 | 1,000 | 2,000 |
| 1 | −268 db | −273 db | −279 db | −282 db | −284 db | −286 db | −287 db | −287 db | −287 db | −287 db | −287 db |
| 30 | −209 db | −214 db | −220 db | −223 db | −225 db | −227 db | −228 db | −228 db | −228 db | −228 db | −228 db |
| 100 | −188 db | −193 db | −199 db | −202 db | −204 db | −206 db | −207 db | −207 db | −207 db | −207 db | −207 db |
| 300 | −169 db | −174 db | −180 db | −183 db | −185 db | −187 db | −188 db | −188 db | −188 db | −188 db | −188 db |
| 1000 | −148 db | −153 db | −159 db | −162 db | −164 db | −166 db | −167 db | −167 db | −167 db | −167 db | −167 db |
| 3000 | −129 db | −134 db | −140 db | −143 db | −145 db | −147 db | −148 db | −148 db | −148 db | −148 db | −148 db |
| 10000 | −109 db | −113 db | −119 db | −122 db | −124 db | −126 db | −127 db | −127 db | −127 db | −127 db | −127 db |
| 20000 | −97 db | −102 db | −107 db | −110 db | −112 db | −114 db | −115 db | −115 db | −115 db | −115 db | −115 db |
| 100000 | −74 db | −76 db | −81 db | −84 db | −86 db | −88 db | −88 db | −89 db | −89 db | −89 db | −89 db |
| 300000 | −64 db | −65 db | −68 db | −71 db | −73 db | −74 db | −75 db | −75 db | −75 db | −75 db | −75 db |
| 1000000 | −61 db | −58 db | −59 db | −60 db | −62 db | −63 db | −64 db | −64 db | −64 db | −64 db | −64 db |

As can be seen from the comparison with Table 2, which will be described later, Table 1 given above indicates that the amount of crosstalk can be suppressed to −20 dB or less over the entire range.

(Comparison)

Figure 3A:
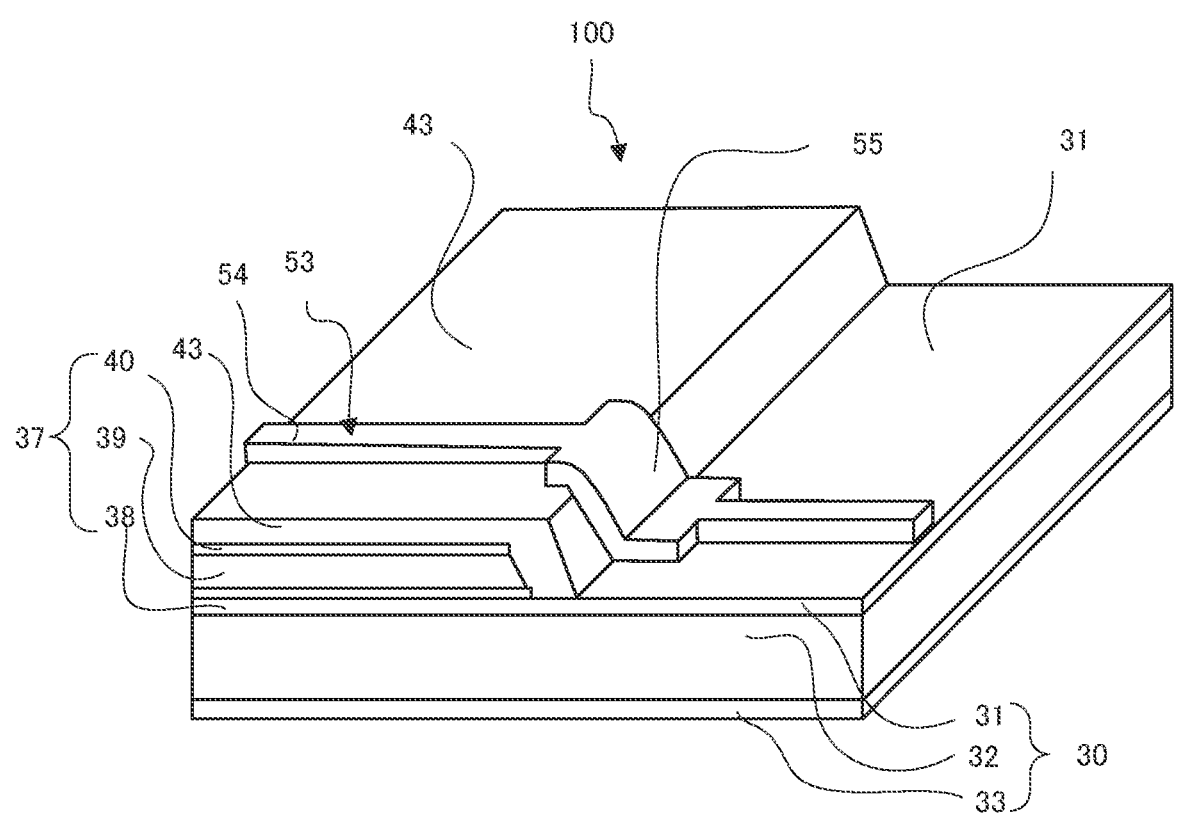
FIG. 3A is a perspective view of a light deflector without a grounding wiring in contrast to the light deflector of FIG. 2A.
Figure 3B:
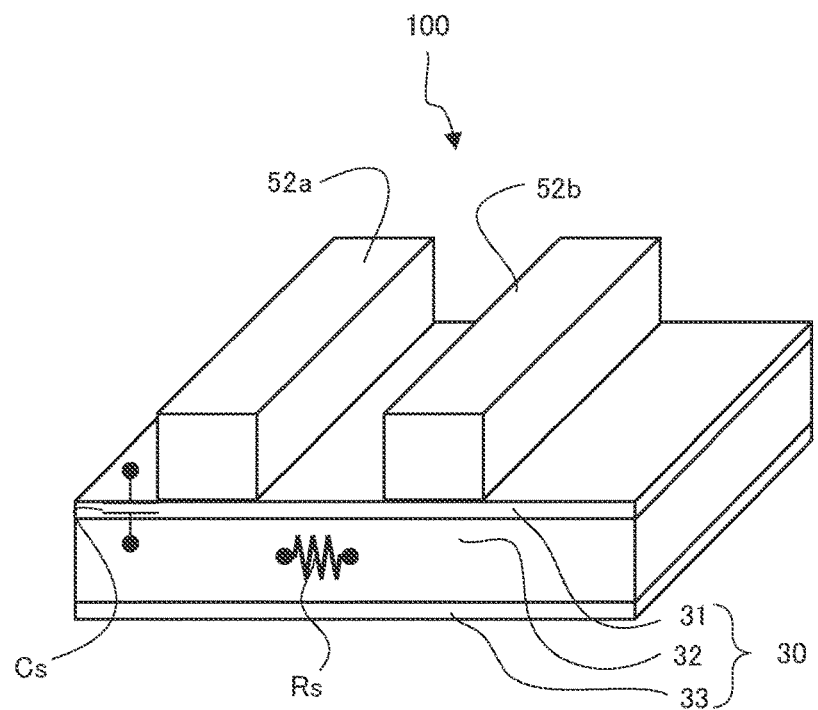
FIG. 3B is a configuration diagram of a major part of the light deflector without the grounding wiring in contrast to the light deflector of FIG. 2C.
Figure 3C:
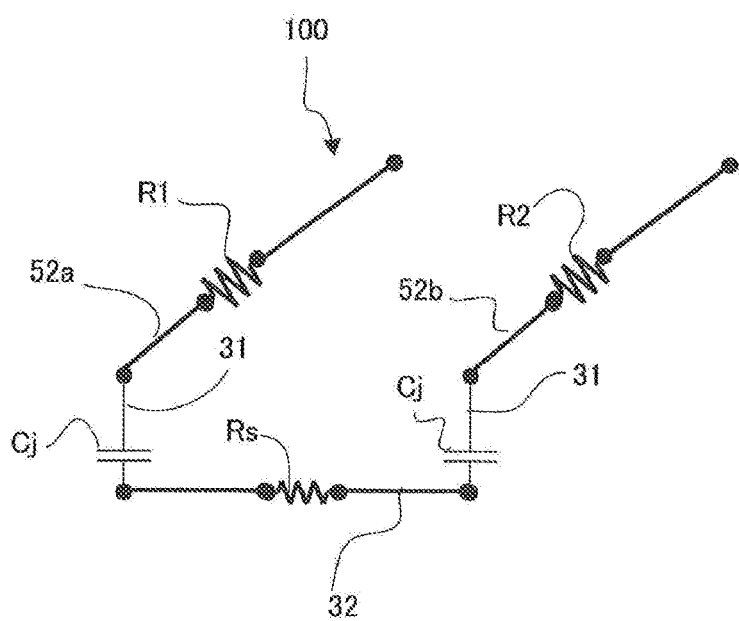
FIG. 3C is an equivalent circuit diagram of FIG. 3B.

FIG. 3A is a perspective view of a light deflector 100, which does not have the grounding wiring 56 and the conductor layer 35 on the connection section 24, in contrast to the light deflector 10 in FIG. 2A. FIG. 3B is a configuration diagram of the major section of the light deflector 100 without the grounding wiring 56 in contrast to the light deflector 10 in FIG. 2C, and FIG. 3C is an equivalent circuit diagram of FIG. 3B. In FIG. 3A to FIG. 3C, the same elements as those in FIG. 2A to FIG. 2D will be assigned the same reference numerals.

The symbols newly added in FIG. 3B and FIG. 3C are defined as follows:

Cs: Capacitance of an SOI 30
Rs: Resistance of the length between a signal wiring 52a and a signal wiring 52b in an oxide film layer 31

The following Table 2 shows the relationship among the frequency of a signal of the signal wiring 52a on the output side, the widths W of the signal wirings 52a and 52b, and the amount of crosstalk when the signal wirings 52a and 52b of FIG. 3B are the wirings on the output side and the input side, respectively. The amount of crosstalk is defined as the signal power of the signal wiring 52b divided by the signal power of the signal wiring 52a. In Table 2, W1=W2 is applied, and W1 is denoted as the wiring width W.

In Table 1, all the results showed the amounts of crosstalk of −20 dB or less, thus making it possible to verify that the crosstalk is suppressed by a grounding wiring 56 and a conductor layer 35 on a connection section 24. Further, in the light deflector 100 of FIG. 3A, it is required to satisfy the condition "the line width W≤10 μm" in order to suppress the amount of crosstalk at 20000 Hz to 20 dB or less. On the other hand, in the above-mentioned Table 1 showing the results on the light deflector 10, the amount of crosstalk at 20000 Hz is suppressed to 20 dB or less even in the case of the line width W≤10 This means that the degree of freedom in design is improved while suppressing crosstalk.

The effect of suppressing crosstalk described above is obtained by the fact that the electric charges accumulated in an interlayer insulating film 43 or an oxide film layer 31 tend to flow to the ground through the conductor layer 35 rather than becoming a crosstalk current between the signal wirings 52a and 52b.

(Manufacturing Method)

Figure 4A:
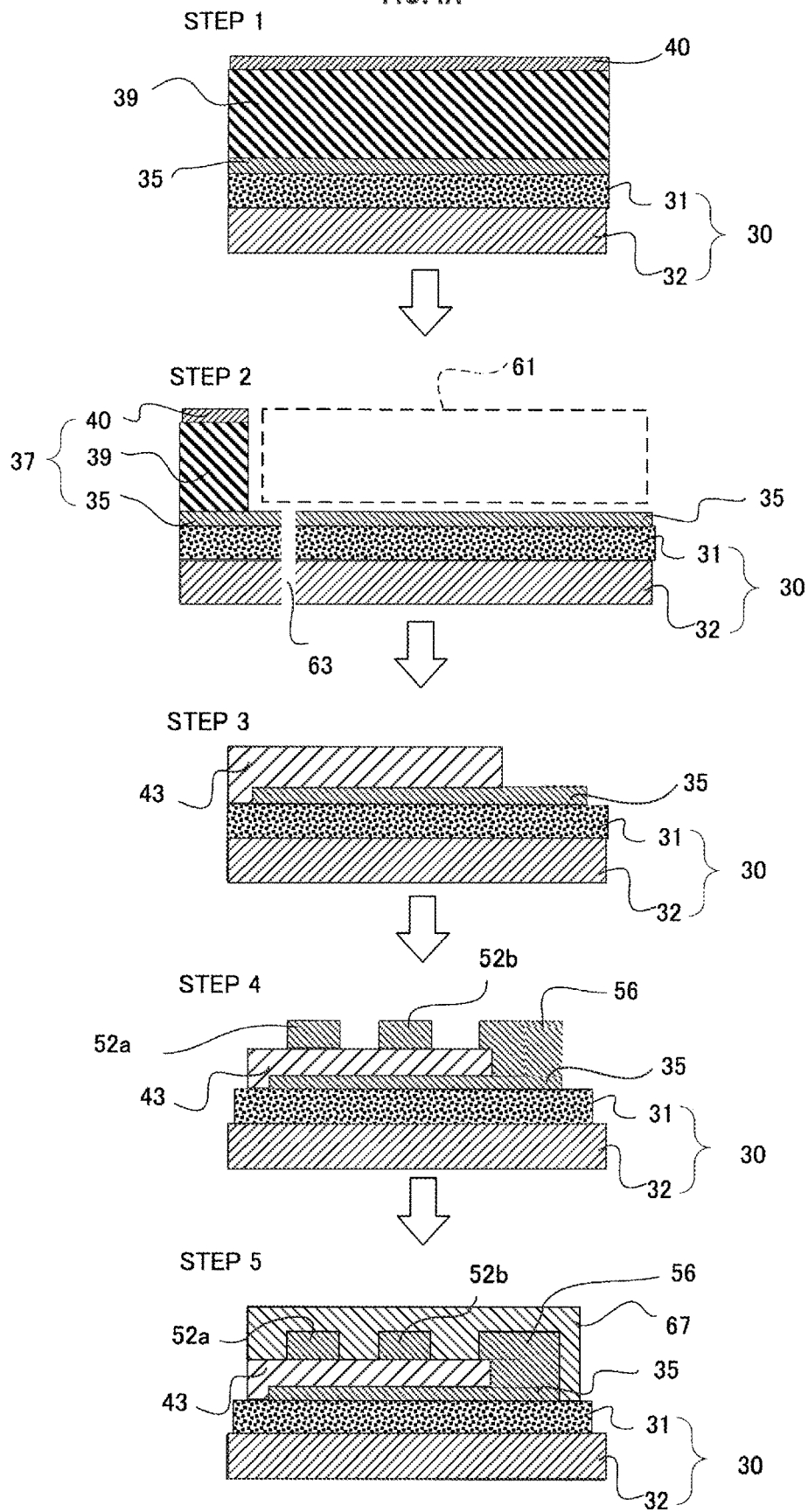
FIG. 4A is a diagram illustrating a major part of the manufacturing method of a light deflector in the order of steps.

FIG. 4A illustrates the major section of the manufacturing method for the light deflector 10 in the order of process steps (STEP). For the sake of simplicity of illustration, a part of the SOI 30 is omitted from below the middle of the silicon layer 32 in the thickness direction (the Z-axis direction in FIG. 1).

In STEP1, the conductor layer 35, the piezoelectric film 39, and the upper electrode 40 are formed in this order from bottom above the surface of the oxide film layer 31.

TABLE 2

| Frequency f | Wiring width w[μm]→ | | | | | | | | Input signal ÷ Output signal Amount of crosstalk db | | |
|---|---|---|---|---|---|---|---|---|---|---|---|
| [Hz] ↓ | 1 | 2 | 5 | 10 | 20 | 50 | 100 | 200 | 500 | 1,000 | 2,000 |
| 1 | −130 db | −124 db | −116 db | −110 db | −104 db | −96 db | −90 db | −84 db | −76 db | −70 db | −64 db |
| 30 | −100 db | −94 db | −86 db | −80 db | −74 db | −66 db | −60 db | −54 db | −46 db | −40 db | −34 db |
| 100 | −90 db | −84 db | −76 db | −70 db | −64 db | −56 db | −50 db | −44 db | −36 db | −30 db | −24 db |
| 300 | −80 db | −74 db | −66 db | −60 db | −54 db | −46 db | −40 db | −34 db | −26 db | −20 db | −14 db |
| 1000 | −70 db | −64 db | −56 db | −50 db | −44 db | −36 db | −30 db | −24 db | −16 db | −10 db | −5 db |
| 3000 | −60 db | −54 db | −46 db | −40 db | −34 db | −26 db | −20 db | −14 db | −7 db | −3 db | −1 db |
| 10000 | −50 db | −44 db | −36 db | −30 db | −24 db | −16 db | −10 db | −5 db | −1 db | 0 db | 0 db |
| 20000 | −44 db | −38 db | −30 db | −24 db | −18 db | −10 db | −5 db | −2 db | 0 db | 0 db | 0 db |
| 100000 | −30 db | −24 db | −16 db | −10 db | −5 db | −1 db | 0 db | 0 db | 0 db | 0 db | 0 db |
| 300000 | −20 db | −14 db | −7 db | −3 db | −1 db | 0 db | 0 db | 0 db | 0 db | 0 db | 0 db |
| 1000000 | −10 db | −5 db | −1 db | 0 db | 0 db | 0 db | 0 db | 0 db | 0 db | 0 db | 0 db |

Based on the above Table 2, the results at W=20 which is the same as the widths W1 and W2 of the signal wirings of the light deflector 10 of FIG. 2A, will be discussed. The results exceed −20 dB at frequencies of 20000 Hz or higher.

In STEP2, in the second surface region 48 (FIG. 2), the piezoelectric film 39 and the upper electrode 40, which are included in a removal part 61, are eliminated by etching. Thus, the surface of the conductor layer 35 is exposed in the removal part 61. However, the conductor layer 35 is removed in a region between a part below the above-mentioned piezoelectric element 37 and the connection section 24 to expose the oxide film layer 31. This makes it possible to separate a region that functions as a lower electrode of the piezoelectric element 37 and a region that functions as grounding for reducing crosstalk. On the other hand, the piezoelectric film 39 and the upper electrode 40 remain in the area where the removal part 61 is absent. The rest of the piezoelectric film 39 and the upper electrode 40 constitutes the piezoelectric element 37 together with the conductor layer 35 under the piezoelectric film 39.

To use the piezoelectric element 37 as a piezoelectric actuator (e.g., the inner actuator 13 and the outer actuator 15 in FIG. 1) rather than a sensor (e.g., the deflection angle sensors 80a and 80b in FIG. 7), it is necessary to form the contours of cantilevers so as to allow relative displacement with respect to a fixed frame 16. Therefore, slits 63 are formed at places corresponding to the contours, and the oxide film layer 31 and a silicon layer 32 are separated by the slits 63 in the plane direction of the light deflector 10 (in the direction of the plane of two axes, X-axis and Y-axis, in FIG. 1). The slits 63 are on cut lines 77, which will be described later with reference to FIG. 7.

In STEP3, the entire surface that has been processed in STEP2 is coated with the interlayer insulating film 43. When vias are used to connect the grounding wiring 56 and the conductor layer 35, vias 59 are further formed at predetermined locations of the interlayer insulating film 43 after the coating.

In STEP4, the entire surface that has been processed in STEP3 is coated with a metal (e.g., a metal containing aluminum as a main component), and further, this metal layer is etched to be separated into the signal wirings 52a and 52b and the grounding wiring 56.

The grounding wiring 56 has a hanging portion on the lower surface thereof and is connected to the conductor layer 35 through the hanging portion.

In STEP5, the entire surface that has been processed in STEP 4 is coated with an insulating film 67.

The section of STEP4 and STEP5 in FIG. 4A illustrates a section of the connection section 24. In STEP1 to STEP5 described above, parts other than the connection section 24 are also formed at the same time.

In FIG. 4B, STEP1 and STEP2 are the same as those of FIG. 4A, and STEP3 to STEP5 are different therefrom. In FIG. 4B, STEP3 to STEP5 illustrate a section of a movable frame 14 (refer to FIG. 7, which will be described later). The grounding wiring 56 and the conductor layer 35 are connected using the vias 59. The vias 59 are formed at a plurality of locations along the extension line of the grounding wiring 56. Therefore, the conductor layer 35 and the grounding wiring 56 are interconnected at appropriate intervals along the extension line of these two.

As with the connection section 24, the movable frame 14 corresponds to the removal part 61 mentioned above. As with the connection section 24, the grounding wiring 56 and the grounded conductor layer 35 are provided also in the movable frame 14 so as to reduce the occurrence of crosstalk.

Figure 5:
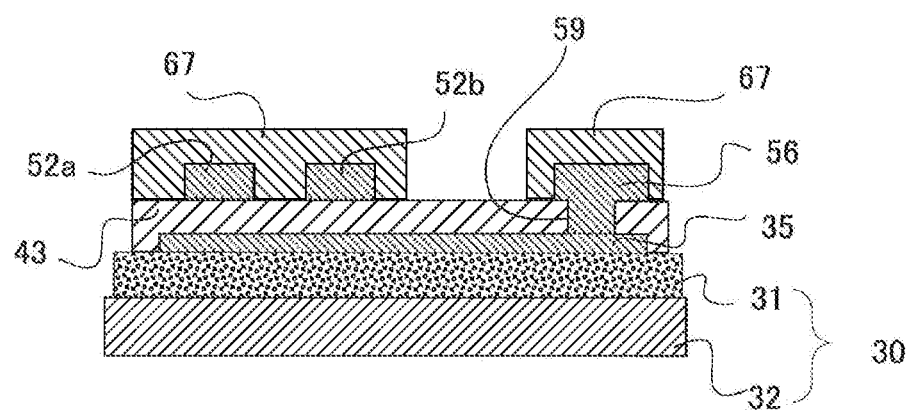
FIG. 5 is a diagram illustrating a section at which a conductor layer and a grounding wiring are connected at a location where a signal wiring and the grounding wiring are separated from each other in a width direction.

FIG. 5 is a diagram of a modified example, illustrating a section in which a conductor layer 35 and a grounding wiring 56 are connected at the location where a signal wiring 52 and the grounding wiring 56 are apart in the width direction. This section differs from the section of STEP5 in FIG. 4A in that the insulating film 67 is split between a signal wiring 52b and the grounding wiring 56.

FIG. 6 illustrates the structure of a section at the location of a piezoelectric element 37 manufactured at the same time in STEP1 to STEP5. A power feed wiring 84 is a wiring for supplying power feed current to a piezoelectric film 39 of an inner actuator 13, which functions as the piezoelectric element 37. The power feed wiring 84 extends in parallel to signal wirings 52a and 52b on the upper surface of an interlayer insulating film 43 in an inner actuator 13. In the interlayer insulating film 43 in the inner actuator 13, one or more vias 64 are formed in the lower surface of the power feed wiring 84.

The power feed wiring 84 is connected to an upper electrode 40 through a hanging portion extending into the via 64. Thus, the piezoelectric film 39 of the inner actuator 13 drives using a conductor layer 35 as a lower electrode and the supply voltage of the upper electrode 40 as the voltages at both ends to rotate a mirror section 11 in a reciprocating manner around the first rotation axis 22y.

FIG. 7 is a diagram of a major part of a wafer before cutting out (sawing) individual light deflectors 10, which is viewed from the front (surface side). Reference numeral 77 denotes a cut line for cutting in the thickness direction prior to sawing. Reference numeral 79 denotes an isolation trench created by cutting.

In the light deflector 10 of the embodiment, the conductor layer 35 may be removed in the mirror section 11 and the torsion bar 12.

Deflection angle sensors 80a and 80b are positioned symmetrically with respect to the first rotation axis 22y and both extend from a torsion bar 12b toward the piezoelectric film 39 of the inner actuator 13. The piezoelectric films 39 of the deflection angle sensors 80a and 80b generate voltages corresponding to the deflection angles (i.e., rotational angles) of the mirror section 11 around the first rotation axis 22y.

Signal wirings 52a and 52b are connected to the deflection angle sensors 80a and 80b, respectively, at one end, run parallel along the peripheral contour of the movable frame 14, and are connected to predetermined electrode pads 20 at the other end through the coupled part between the movable frame 14 and the outer actuator 15, and each cantilever 18 and each connection section 24 of the outer actuator 15.

In FIG. 7, each region is defined as follows:
Region where wavy lines extending in the vertical direction are arranged in the horizontal direction: Piezoelectric film 39
Dark gray region: Grounding wiring 56
Light gray region: Signal wirings 52a and 52b and the power feed wiring 84
Region surrounded by dashed line D1: Region on the movable frame 14 in which the signal wirings 52a and 52b and the grounding wiring 56 extend in parallel
Region surrounded by dashed line D2: Region on the connection section 24 in which the signal wirings 52a and 52b, the grounding wiring 56, and the power feed wiring 84 extend in parallel
Although only one power feed wiring 84 is illustrated in the drawing, there are a plurality of the power feed wirings 84, which are required for the odd-numbered and even-numbered actuators of the outer actuator 15 having a meander structure, and the inner actuator 13.

DESCRIPTION OF THE DETAILED STRUCTURE

The conductor layer 35 directly under the piezoelectric element 37 is used as the lower electrode of the piezoelectric element 37. Therefore, as the material of the conductor layer 35, platinum (Pt), which is compatible with the PZT film formation of the piezoelectric film 39, is used. However, Pt has a high Young's modulus and adversely affects piezoelectric drive, so that the film thickness can only be increased to approximately 100 nm. Further, the resistivity is high, 13.6 μΩ·cm, so that sufficient conductivity cannot be secured. Consequently, aluminum having low resistivity, 2.65 μΩ·cm, for the wiring 53 is used, and the film thickness can be increased to approximately 500 nm. This makes it possible to reduce the sheet resistance to 4%.

Further, the grounding wiring 56 and the signal wiring 52 are formed by the same process, thereby avoiding an increase in cost. Current by voltage drive hardly flows through the signal wiring 52, so that crosstalk and capacitance are suppressed by laying out the signal wiring 52 to be thin, and noise is reduced by laying out the grounding wiring 56 to be thick. On the ground side, the wiring and the PZT lower electrode have the same potential and the capacitance therebetween has no electrical effect, so that it is desirable to secure a maximum area and reduce the resistance.

The oxide film thickness as the thickness of the oxide film layer 31 that separates the silicon layer 32 and the wiring 53 is preferably in the range of 300 nm or more and 2000 nm or less, and desirably 1000 nm. This is because a thin oxide film reduces withstand voltage, while a thick oxide film causes its own rigidity to interfere with drive.

The wiring film thickness as the film thickness of the wiring 53 (the signal wirings 52a and 52b) is preferably in the range of 30 nm or more and 1000 nm or less, and desirably 500 nm. If the film thickness of the wiring 53 is small, then the resistance increases and an electrical cutoff frequency decreases. Further, if the film thickness of the wiring 53 is large, then the amount of side etch due to processing increases, making it difficult to control a wiring width.

If the wiring film thickness is 500 nm, then the wiring thickness is desirably 1 or more per 1 mA of current amount. Electromigration is known to occur in aluminum wiring and can be eliminated by reducing current density.

In the arrangement of the signal wiring 52a and the signal wiring 52b in FIG. 5, the grounding wiring 56 may be placed between the signal wiring 52a and the signal wiring 52b. This is because, unlike liquids, the resistance of electricity is determined not by direction but by distance. When the distance between the wirings is long and the ground wiring is to be placed close, the grounding wiring 56 is desirably set in the middle.

The wiring 53 may be made of an aluminum alloy obtained by adding Cu or Nd to aluminum. Pure aluminum causes electromigration or metal fatigue due to repetitive stress, and is therefore alloyed by adding Cu or the like.

The wiring 53 may be made of another metal material such as silver or copper. This is because the conductive capacity depends on electrical resistance rather than the type of metal.

The description has been given using signal wiring 52a and the signal wiring 52b as the wiring 53 in which the crosstalk occurs. However, crosstalk also occurs in the wirings 84 for feeding power to the actuators using inverse piezoelectric effect of applying a voltage to operate a piezoelectric body. Crosstalk can also occur between the power feed wirings 84 and between the power feed wirings 84 and the signal wirings 52a and 52b. A drive signal is also supplied to the power feed wirings 84. The power feed wirings 84 and the signal wirings 52a and 52b are all wirings through which signals are supplied. The wirings for the actuators are a main cause of noise generation, and the influence on others can be reduced by removing the noise.

The light deflector 10 is applied to a MEMS mirror apparatus using AC signals of 1 Hz to 1 MHz and a piezoelectric MEMS device used in a seamless ADB.

The material of the conductor layer 35 as the lower electrode of the piezoelectric element 37 is typically platinum. Platinum has higher resistivity than aluminum or the like. Further, in order to secure the flexibility of the piezoelectric element 37, the lower electrode thereof cannot be made thicker. Consequently, as the extending length of the conductor layer 35 increases, the resistance increases. In the light deflector 10, the grounding wiring 56 (e.g., aluminum wiring) is extended separately from the conductor layer 35, and the grounding wiring 56 is connected to the conductor layer 35 as necessary at a plurality of extension points. This makes it possible to decrease a drop in voltage between the ground electrode 58 and the conductor layer 35 that is distant.

In the light deflector 10, as described with reference to FIG. 5, the grounding wiring 56 is connected to the conductor layer 35 at locations where the piezoelectric element 37 does not exist under the interlayer insulating film 43.

In the light deflector 10, the power feed wirings 84 are provided in addition to the signal wiring 52. The power feed wirings 84 supply a resonance drive voltage, so that the drive voltage has a high frequency, leading to a likelihood of the occurrence of crosstalk in the signal wiring 52. The conductor layer 35 also provides countermeasures against the problem.

In FIG. 5, the grounding wiring 56 is positioned on the outer side of the signal wirings 52a and 52b in the arrangement direction. If the grounding wiring 56 is positioned between the signal wirings 52a and 52b in the arrangement direction, then the grounding wiring 56 functions as a shield, making it possible to further suppress the noise of the signal wirings 52a and 52b.

Modified Example 1

Figure 8A:
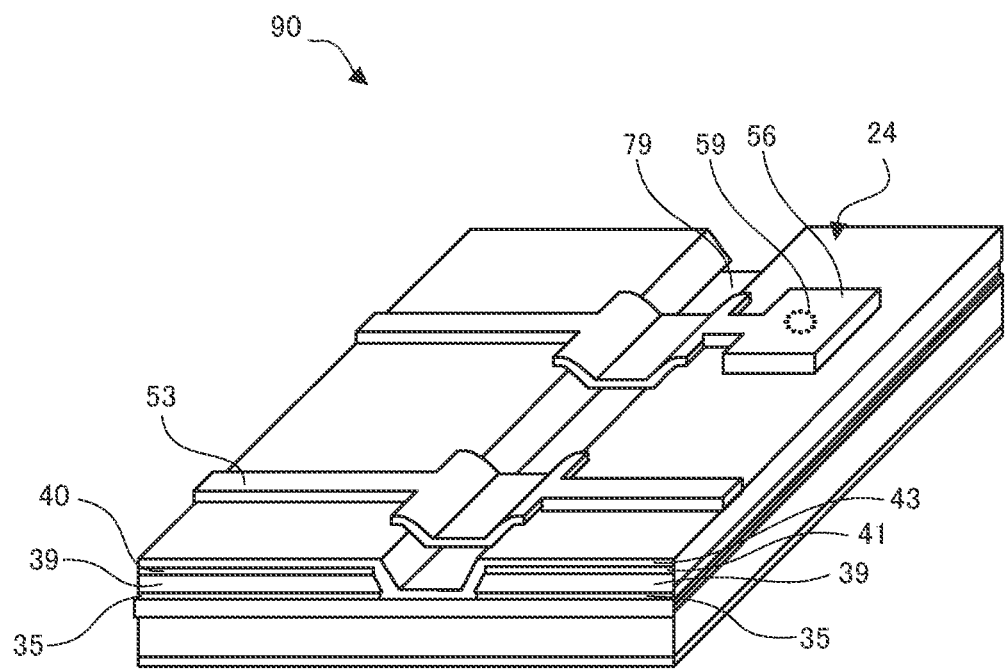
FIG. 8A is a perspective view of a connection section of a light deflector which is a modified example of the present invention.
Figure 8B:
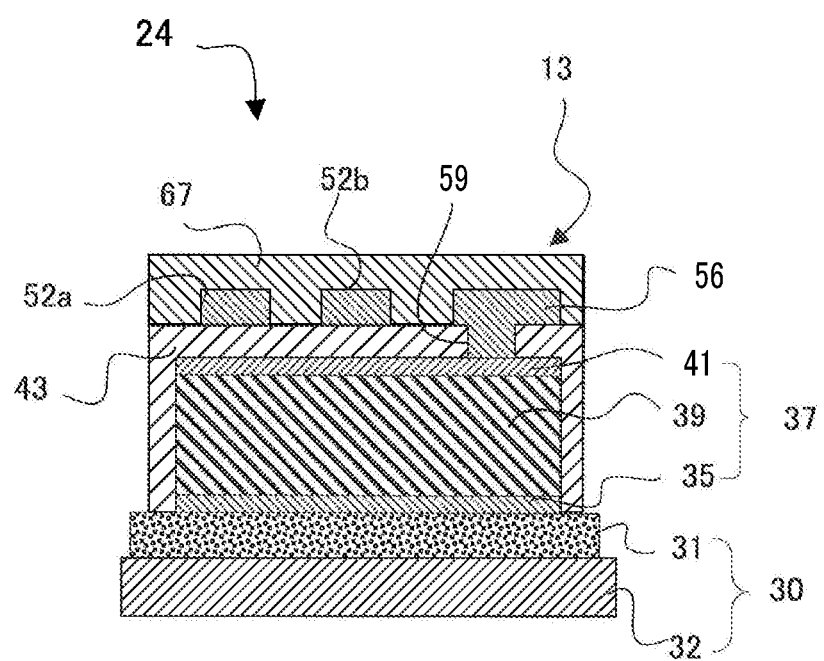
FIG. 8B is a sectional view passing through a via of FIG. 8A.

In the light deflector 10 of the embodiment described above, the piezoelectric film 39 was removed on the connection section 24, but alternatively can be left. FIG. 8A is a perspective view of a connection section 24 of a light deflector 90 as a modified example of the present invention. FIG. 8B is a sectional view passing through a via 59 of FIG. 8A.

In the light deflector 90, a piezoelectric film 39 is left on the connection section 24. Only one wiring 53 is illustrated in FIG. 8A for the purpose of simplification, whereas signal wirings 52a and 52b are illustrated in FIG. 8B. The power feed wirings 84 are omitted in both drawings. The light deflector 90 is the same as the light deflector 10 except for the appearance of the connection section 24.

At the location of an isolation trench 79, the piezoelectric film 39 and an upper electrode 40 are separated in the horizontal direction. The isolation trench 79 extends along the boundary line between the cantilever 18 of the outer actuator 15 and the connection section 24. Therefore, in this light deflector 90, although the three-layer laminated structure, which includes the conductor layer 35, the piezoelectric film 39, and the conductor layer 41, remains in the connection section 24, no drive voltage is applied to the conductor layer 41 from the power feed wirings 84.

The conductor layer 41 is a layer formed as a film integral with the upper electrode 40 and then separated by the isolation trench 79. Therefore, the connection section 24 does not have the function of an actuator (piezoelectric element). However, the grounding wiring 56 is connected to the conductor layer 41. In the present modified example, the conductor layer 41 and the grounding wiring 56 are connected through the via 59. If the conductor layer 41 and the ground electrode 36 were not present, the interlayer insulating film 43 and the piezoelectric film 39, which are both dielectrics, would function as capacitors in the same manner as when the piezoelectric film 39 is absent, and might cause crosstalk between the wirings 53 (e.g., the signal wirings 52*a* and 52*b*). On the other hand, the presence of the grounded conductor layer 41 prevents crosstalk.

Modified Example 2

Figure 9:
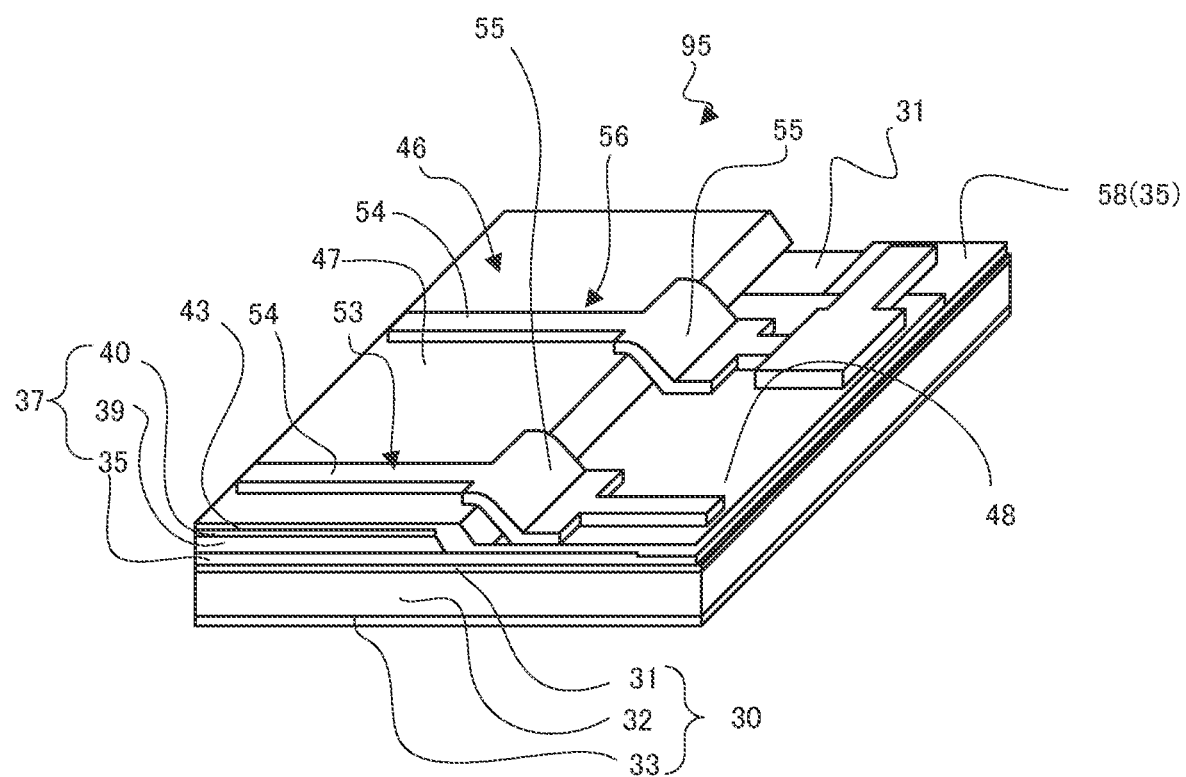
FIG. 9 is a view illustrating a light deflector which is still another modified example of the present invention.

In the light deflector 10, the conductor layer 35 is separated directly under the piezoelectric film 39 and the connection section 24 and not electrically connected; however, the conductor layer 35 may alternatively be formed over the entire surface and electrically connected. FIG. 9 is a diagram illustrating a light deflector 95 of a modified example of the present invention. Because of the electrical connection, a conductor layer 35, which is also the lower electrode of a piezoelectric element 37, is also grounded. The power supplied to an upper electrode 40 of the piezoelectric element 37 has a drive waveform, so that the lower electrode can be driven even if the lower electrode is grounded.

DESCRIPTION OF REFERENCE NUMERALS

10 . . . light deflector; 13 . . . inner actuator (piezoelectric element); 15 . . . outer actuator (piezoelectric element); 30 . . . SOI; 31 . . . oxide film layer; 32 . . . silicon layer; 35 . . . conductor layer; 37 . . . piezoelectric element; 39 . . . piezoelectric film; 40 . . . upper electrode; 43 . . . interlayer insulating film; 52 . . . signal wiring; 56 . . . grounding wiring; 58 . . . ground electrode; 80*a*, 80*b* . . . deflection angle sensor (piezoelectric element); and 84 . . . power feed wiring.

What is claimed is:

1. A MEMS device comprising:
   a mirror section and a movable frame surrounding the mirror section;
   a plurality of piezoelectric elements, the plurality of piezoelectric elements including an inner piezoelectric element provided inside the movable frame to move the mirror section and an outer piezoelectric element provided outside the movable frame to move the mirror section, and the outer piezoelectric element comprising plural piezoelectric elements forming a meander pattern and connected by a connection section;
   a silicon substrate which has an insulating layer on a surface side thereof and which is composed of (i) a first region as a region where the plural outer piezoelectric elements are formed, and (ii) a second region comprising the connection section as a region where the plural outer piezoelectric elements are not formed;
   an insulating film which covers the piezoelectric elements from the surface side; and
   a plurality of wirings which are formed in a surface region of the insulating film in the first region and through which signals flow,
   wherein:
   each of the piezoelectric elements is composed of an upper electrode, a piezoelectric film, and a lower electrode in this order from a top thereof,
   the second region includes a conductor layer, the insulating film, and the plurality of wirings extending from the first region and being stacked on the conductor layer,
   the conductor layer in the second region is grounded, and
   a grounding wiring extends in parallel to the plurality of wirings on a surface of the insulating film in the first region, the grounding wiring being connected to the conductor layer in the second region, and the grounding wiring being thicker than the plurality of wirings.

2. The MEMS device according to claim 1, wherein the grounding wiring is connected to the conductor layer in the surface region of the insulating film under which the piezoelectric elements do not exist.

3. The MEMS device according to claim 2, further comprising:
   a deflection angle sensor for the piezoelectric elements, wherein the plurality of wirings include a wiring for a signal from the sensor.

4. The MEMS device according to claim 1, wherein the conductor layer is a material layer containing platinum as a main component, and each of the plurality of wirings is a metal wiring containing aluminum as a main component.

5. A MEMS device comprising:
   a mirror section and a movable frame surrounding the mirror section;
   a plurality of piezoelectric elements, the plurality of the piezoelectric elements including an inner piezoelectric element provided inside the movable frame to move the mirror section and an outer piezoelectric element provided outside the movable frame to move the mirror section, and the outer piezoelectric element comprising plural piezoelectric elements forming a meander pattern and connected by a connection section;
   a silicon substrate which has an insulating layer on a surface side thereof and which is composed of (i) a first region as a region where the plural outer piezoelectric elements are formed, and (ii) a second region as a region in the movable frame where the plural outer piezoelectric elements are not formed;
   an insulating film which covers the piezoelectric elements from the surface side; and
   a plurality of wirings which are formed in a surface region of the insulating film in the first region and through which signals flow,
   wherein:
   each of the piezoelectric elements is composed of an upper electrode, a piezoelectric film, and a lower electrode in this order from a top thereof,
   the second region includes a conductor layer, the insulating film, and the plurality of wirings extending from the first region and being stacked on the conductor layer,
   the conductor layer in the second region is grounded, and
   a grounding wiring extends in parallel to the plurality of wirings on a surface of the insulating film in the first region, the grounding wiring being connected to the conductor layer in the second region, and the grounding wiring being thicker than the plurality of wirings.

* * * * *